United States Patent [19]
Snow

[11] Patent Number: 5,237,615
[45] Date of Patent: Aug. 17, 1993

[54] MULTIPLE INDEPENDENT BINARY BIT STREAM GENERATOR

[75] Inventor: Brian D. Snow, Laurel, Md.

[73] Assignee: The United States of America as represented by the National Security Agency, Ft. George G. Meade, Md.

[21] Appl. No.: 452,476

[22] Filed: May 20, 1982

[51] Int. Cl.$^5$ .............................................. H04K 1/00
[52] U.S. Cl. ........................................ 380/47; 380/50
[58] Field of Search ............... 178/22.03, 22.15, 22.16, 178/22.19, 22.14; 380/46, 47, 49, 50; 364/717, 717.5

[56] References Cited

U.S. PATENT DOCUMENTS

| | | | |
|---|---|---|---|
| 3,364,308 | 1/1968 | Vasseur | 178/22.16 |
| 3,506,783 | 4/1970 | Mo et al. | 178/22.15 |
| 3,691,472 | 9/1972 | Bohman | 178/22.16 |
| 3,876,832 | 4/1975 | Morgan et al. | 178/22.03 |
| 3,911,216 | 10/1975 | Bartek et al. | 178/22.15 |
| 3,911,330 | 10/1975 | Fletcher et al. | 178/22.15 |
| 4,004,089 | 1/1977 | Richard et al. | 178/22.15 |
| 4,181,816 | 1/1980 | Vasseur | 178/22.16 |
| 4,225,935 | 9/1980 | Zscheile et al. | 178/22.15 |

*Primary Examiner*—Salvatore Cangialosi
*Attorney, Agent, or Firm*—John R. Utermohle; Thomas O. Maser

[57] ABSTRACT

An apparatus for producing multiple independent binary bit streams from a single underlying key stream. The output from a high speed key generator is fed serially into a multistage shift register. At preselected intervals, the contents of the register are parallel dumped and logically combined with a stored binary word to generate a binary bit which is gated to an output. A plurality of linearly independent binary bit streams result when the register contents are combined with a plurality of linearly independent binary words, one word for each output.

5 Claims, 1 Drawing Sheet

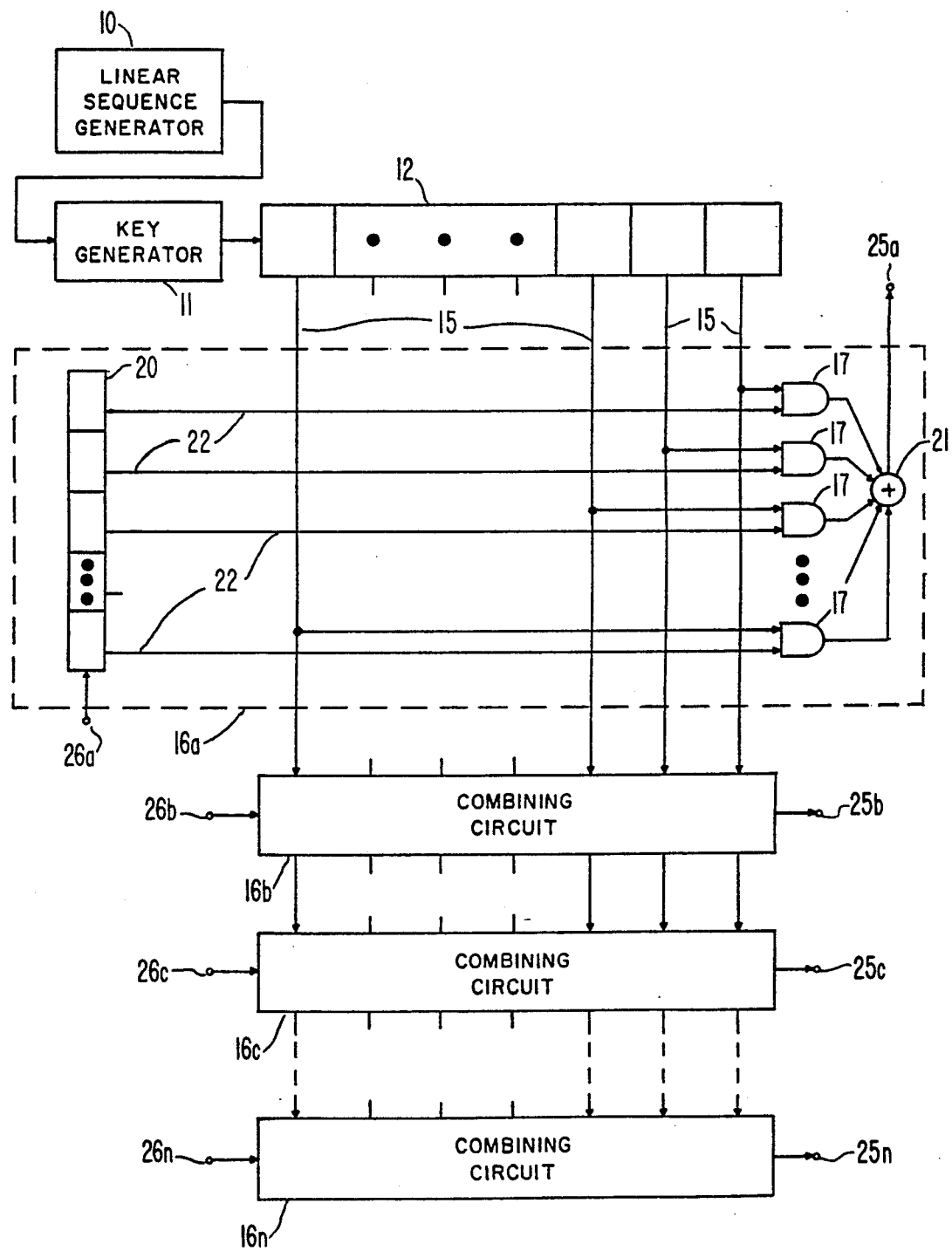

MULTIPLE INDEPENDENT BINARY BIT STREAM GENERATOR

BACKGROUND OF THE INVENTION

1. Field of the Invention

My invention relates to the field of key generation, and more specifically to generation of multiple independent key streams from a single underlying key stream.

2. Description of the Prior Art

Key generators, devices which create a seemingly random binary bit sequence, are used in communications for many useful purposes. Examples of common uses include message encryption, anti-jam protection, and spread spectrum communications. When multiple channels are involved, it is common to provide an independent key stream for each channel by simply including a plurality of key generators—one for each channel. Obvious drawbacks of this approach include the increased quantity of items required and the associated problems of synchronizing multiple equipments. A simpler method found in the prior art is to provide the same key stream to each channel, or to provide a different time-delayed offset of the same key stream to each channel. The close mathematical relationship of the individual streams, however, makes analysis of the transmitted signals relatively straightforward with the result that encrypted messages may be broken and anti-jam measures may be defeated.

Still another known method of producing multiple key streams from a single source is to create a single high speed key stream stepping at a rate equal to $m \times n$, where m is the number of channels and n is the bit rate required per channel. Each channel may utilize every $m^{th}$ bit of the stream in a time division multiplex format to develop its own independent n-bit stream. This procedure is limited to the extent that it allows a maximum of m channels per device.

There is a need for an apparatus capable of generating multiple mathematically independent key streams, but having reduced cost, complexity and weight over the structures in the prior art. More specifically, there is a need for an apparatus capable of creating $2^m$ such key streams, varying numbers of which may be in use at any given time, each key able to provide a high degree of cryptographic security.

SUMMARY OF THE INVENTION

It is an object of my invention to provide an apparatus which overcomes certain deficiencies of the prior art.

It is also an object of my invention to provide multiple independent key streams from a single key generator.

Another object is to increase the efficiency of a key generator by creating multiple independent key streams from a single output.

It is also an object to provide an efficient bit stream generator for use with multichannel communications systems.

Still another object is to provide a key generating apparatus particularly useful for spread spectrum communications systems.

It is a further object to generate a plurality of synchronized key streams without yielding usable depths.

An apparatus capable of achieving these and other desirable features includes means for generating a first binary bit stream at a first rate, and a plurality of circuits, each circuit comprising: means for receiving and storing a binary word; means for periodically combining selected bits from said first binary stream with the binary word in said storing means to generate a binary bit; and output means connected to said combining means for sequentially receiving said periodically generated binary bits at a second rate less than said first rate.

BRIEF DESCRIPTION OF THE DRAWING

The FIGURE is a simplified block diagram of a multiple, independent binary bit stream generator illustrative of my invention.

DESCRIPTION OF THE PREFERRED EMBODIMENT

The FIGURE illustrates a linear sequence generator 10 which drives a key generator 11. The key generator supplies a pseudorandum binary bit stream to a multistage serial shift register 12 having a plurality of output lines 15—15, one line from each stage of register 12. A combining circuit 16a includes a plurality of AND gates 17—17, a multistage serial shift register 20, and a modulo-2 adder 21. Each of the AND gates 17—17 has two inputs, one connected to an output of shift register 12 via one of the lines 15—15, and the other connected to an output of shift register 20 via one of the lines 22—22. Adder 21 sums the signals from each of the AND gates 17—17 and provides a signal to a first output terminal 25a. A plurality of additional combining circuits 16b–16n, each configured similarly to combining circuit 16a, also connect to the output lines 15—15 of shift register 12 and provide an output signal to one of the output terminal 25b-25n respectively.

Linear sequence generator 10 may be configured in one of several well known ways. The construction and principle of operation of such devices are documented in the prior art, for example, in Petersen, Wesley W., *Error Correcting Codes*, (New York: John Wiley & Sons, 1961) pp. 118–123. The necessary criteria for the device is that it be capable of creating a seemingly random but reproducable long cycle binary sequence.

Key generator 11 may also be any one of several well known devices. The output rate of key generator 11 must at least equal the number of stages in shift register 12 times the maximum desired bit rate at each of the output terminals. That is, if it is desired that each of five combining circuits produce a 2 million bits per second key stream, key generator 11 must output at least 5×2 million, or 10 million, bits per second.

Shift register 12 is a conventional clocked multi-stage device, each stage capable of receiving and holding a binary signal. A clock pulse causes the binary value in a given stage to shift one stage to the right, with a new value entered into the leftmost stage from key generator 11. Shift register 20 has an input terminal 26a through which its stages may be serially filled. Clock pulses for shifting data into register 20 must be independent of those for register 12 for reasons which will become clear below. Each of the AND gates 17—17 receives one input from each of the shift registers 12 and 20 provides an output which is a function of the binary values of the inputs according to the truth table below:

| AND | 0 | 1 |
| --- | --- | --- |
| 0 | 0 | 0 |
| 1 | 0 | 1 |

Each of the other combining circuits 16b-16n also has an input terminal 26b-26n through which data may be clocked into its shift register.

THEORY OF OPERATION

For purposes of explanation, let it be assumed that key generator 11 is producing a pseudorandum binary output at the rate of 20 million bits per second. Also let it be assumed that shift register 12 has 10 delay stages. Following every tenth step of key generator 11, a pulse will be provided by the device timing circuitry (not shown) to gate the contents of register 12 onto lines 15—15 and into the AND gates 17—17. It should be readily apparent that a unique 2 MHz key stream will be present on each of the lines 15—15 with each key stream containing every 10th key bit emitted by key generator 11.

Shift register 20 will be filled with a predetermined binary sequence prior to the start of key generation, and this fill will remain constant throughout the period that information is being transmitted. If a stage of register 20 is filled with a binary "1", the AND gate to which that stage is connected will output a "1" only when the input from register 12 is also a "1". If the stage of register 20 contains a binary "0", the AND gate to which that stage is connected will output a "0" at all times regardless of the input from register 12. Each combining circuit is given a binary sequence for insertion into its shift register which is different from that in each of the other combining circuits.

During the key generation process, key is gated out of register 15 after each tenth step of key generator 11, with each bit of key provided to a single one of the AND gates 17—17, in combining circuit 16a. The output of that AND gate is the product of bits presented, one from register 12 and one from register 20. Binary adder 21 sums all of the outputs from AND gates 17—17 to create a single key bit which is provided to output terminal 25a. This key bit is determined both by the output of key generator 11 and by the contents of register 20. In a similar way, combining circuit 16b will receive key bits from register 12 which will be multiplied by the contents of its internal shift register. The outputs of the individual AND gates within combining circuit 16b will be mod-2 added to yield a key bit at output terminal 25b. The key stream appearing at terminal 25b will differ from that on terminal 25a because the contents of register 20 will differ from the contents of the similar register within combining circuit 16b. Each of the remaining combining circuits will create a unique key stream at its output terminal so long as its internal shift register is filled with a unique binary sequence.

By a straight-forward mathematical analysis it is possible to prove that the key streams at the outputs 25a-25n will be linearly related only when the binary sequences in the combining circuit shift registers 20a-20n form a linearly dependent set of vectors over GF(2). The technique of avoiding linear dependence in the key streams is merely one of choosing register fills which are not linearly dependent. This can be done in many ways. It may be further demonstrated that, if the apparatus of my invention is limited to no more than three combining circuits, any set of vectors will be made linearly independent simply by restricting the vectors to those having an odd number of "1"s.

I claim:

1. An apparatus for generating a plurality of binary bit streams, comprising:
    means for generating a first binary bit stream at a first rate, and
    a plurality of circuits, each circuit comprising:
    (1) means for receiving and storing a binary word;
    (2) means for periodically combining selected bits from said first binary stream with the binary word in said storing means to generate a binary bit; and
    (3) output means connected to said combining means for sequentially receiving said periodically generated binary bits at a second rate less than said first rate.

2. The apparatus of claim 1 wherein said means for generating a first binary bit stream is a key generator.

3. The apparatus of claim 1 wherein said means for generating a first binary bit stream further includes a first multistage serial shift register connected to the key generator.

4. The apparatus of claim 3 wherein said means for receiving and storing a binary word is a second multistage serial shift register.

5. The apparatus of claim 4 wherein said combining means comprises a plurality of logic AND gates, each gate having a first input connected to a selected stage of said first shift register and a second input connected to a selected stage of said second shift register, and a modulo-2 adder connected to each of said AND gates.

* * * * *